United States Patent [19]
Nomura et al.

[11] Patent Number: 4,544,648
[45] Date of Patent: Oct. 1, 1985

[54] CATALYST COMPONENT FOR POLYMERIZATION OF OLEFINS

[75] Inventors: Takeshi Nomura; Kouji Maruyama; Hiroshi Ueno; Naomi Inaba, all of Saitama, Japan

[73] Assignee: Toa Nenryo Kogyo Kabushiki Kaisha, Tokyo, Japan

[21] Appl. No.: 615,015

[22] Filed: May 29, 1984

[30] Foreign Application Priority Data

May 31, 1983 [JP] Japan ................................. 58-94895

[51] Int. Cl.$^4$ .............................................. C08F 4/64
[52] U.S. Cl. .................................... 502/119; 502/112; 502/128; 526/127; 526/128; 526/124; 526/125
[58] Field of Search ........................ 502/112, 119, 128

[56] References Cited

U.S. PATENT DOCUMENTS

| | | | |
|---|---|---|---|
| 3,094,568 | 6/1963 | Hay et al. | 502/128 X |
| 4,250,287 | 2/1981 | Matlack | 502/128 X |
| 4,279,776 | 7/1981 | Shiga et al. | 502/119 X |
| 4,301,029 | 11/1981 | Caunt et al. | 502/119 X |
| 4,485,186 | 11/1984 | Ueno et al. | 502/128 |

Primary Examiner—Patrick P. Garvin
Attorney, Agent, or Firm—M. B. Kurtzman

[57] ABSTRACT

A catalyst component for the polymerization of olefins and particularly ethylene which is prepared by contacting a contact product of a magnesium alkoxide, a halogenated hydrocarbon, a halogenated silane with a titanium compound. The catalyst component in combination with a organoaluminum cocatalyst is useful for the polymerization of ethylene having a high melt index.

10 Claims, No Drawings

CATALYST COMPONENT FOR POLYMERIZATION OF OLEFINS

BACKGROUND OF THE INVENTION

The present invention relates to a catalyst component for polymerization of olefins. More particularly, it relates to a catalyst component which is especially useful for producing ethylene (co)polymers efficiently.

Heretofore, there have been proposed several catalyst components which are used for homopolymerization of ethylene or for copolymerization of ethylene and an alpha-olefin. Such catalyst components are prepared by contacting a base material of magnesium compound and titanium compound with a variety of compounds. In our copending application Ser. No. 418,500 filed Sept. 15, 1982, and now Patent No. 4,485,186, we disclose and claim a catalyst component for polymerization of olefins which is prepared by contacting a magnesium alkoxide, a halogenated hydrocarbon, and a titanium compound with one another. When used for polymerization of olefins, this catalyst component exhibits high catalytic activity and produces a good effect of molecular weight modification by hydrogen which works as a molecular weight modifier. In addition, it provides polymers having a high bulk density. However, in the production of polymers having a high melt index, say, higher than 30, particularly higher than 100, there is formed an undesirable amount of low-molecular fraction which is soluble in the polymerization solvent employed.

DISCLOSURE OF THE INVENTION

Object of the Invention

It is an object of this invention to provide a catalyst component for the polymerization of olefins which exhibits high activity for (co)polymerization, helps greatly hydrogen which works as a molecular weight modifier to produce its effect, and forms only a small amount of low-molecular fraction which is soluble in the polymerization solvent, when used for producing polymers of high melt indices.

The present inventors found that the object of this invention is achieved by a catalyst component which is obtained by contacting a magnesium alkoxide and a halogenated hydrocarbon with a halogenated silane compound prior to their contact with a titanium compound. This invention is based on this finding.

SUMMARY OF THE INVENTION

The gist of this invention resides in a catalyst component for polymerization of olefins which is prepared by contacting a contact product of a magnesium alkoxide, a halogenated hydrocarbon, and a halogenated silane compound with a titanium compound.

RAW MATERIALS FOR CATALYST COMPONENT

The raw materials used for preparing the catalyst component of this invention are described below.

(1) Magnesium alkoxide

The magnesium alkoxide used in this invention is represented by the formula $Mg(OR)(OR')$, wherein R and R' are alkyl, alkenyl, cycloalkyl, aryl, or aralkyl groups having 1 to 20 carbon atoms, preferably 1 to 10 carbon atoms, and R and R' may be the same or different.

These compounds include, for example, $Mg(OCH_3)_2$, $Mg(C_2H_5)_2$, $Mg(OCH_3)(OC_2H_5)$, $Mg(Oi-C_3H_7)_2$, $Mg(OC_3H_7)_2$, $Mg(OC_4H_9)_2$, $Mg(Oi-C_4H_9)_2$, $Mg(OC_4H_9)(Oi-C_4H_9)$, $Mg(OC_4H_9)-(Osec-C_4H_9)$, $Mg(OC_6H_{13})_2$, $Mg(OC_8H_{17})_2$, $Mg(OC_6H_{11})_2$, $Mg(OC_6H_5)_2$, $Mg(OC_6H_4CH_3)_2$, and $Mg(OCH_2C_6H_5)_2$.

The magnesium alkoxides should preferably be dried before use, and more preferably be dried with heating under reduced pressure. After drying, they should preferably be crushed.

(2) Halogenated hydrocarbon

The halogenated hydrocarbon used in this invention is a mono- and polyhalogen substitute of saturated or unsaturated aliphatic, alicyclic, or aromatic hydrocarbon having 1 to 12 carbon atoms. Examples of aliphatic compounds include methyl chloride, methyl bromide, methyl iodide, methylene chloride, methylene bromide, methylene iodide, chloroform, bromoform, iodoform, carbon tetrachloride, carbon tetrabromide, carbon tetraiodide, ethyl chloride, ethyl bromide, ethyl iodide, 1,2-dichloroethane, 1,2-dibromoethane, 1,2-diiodoethane, methylchloroform, methylbromoform, methyliodoform, 1,1,2-trichloroethylene, 1,1,2-tribromoethylene, 1,1,2,2-tetrachloroethylene, pentachloroethane, hexachloroethane, hexabromoethane, n-propylchloride, 1,2-dichloropropane, hexachloropropylene, octachloropropane, decabromobutane, and chlorinated paraffin. Examples of alicyclic compounds include chlorocyclopropane, tetrachlorocyclopentane, hexachloropentadiene, and hexachlorocyclohexane. Examples of aromatic compounds include chlorobenzene, bromobenzene, o-dichlorobenzene, p-dichlorobenzene, hexachlorobenzene, hexabromobenzene, benzotrichloride, and p-chlorobenzotrichloride. These compounds may be used individually or in combination with one another.

(3) Halogenated silane compound

The halogenated silane compound used in this invention is represented by the formula $R''_mSiX_{4-m}$, wherein R'' is a hydrogen atom or a hydrocarbon group having 1 to 10 carbon atoms, X is a halogen atom, and m is 0, 1, 2 or 3.

It includes, for example, silicon tetrachloride, methyltrichlorosilane, ethyltrichlorosilane, propyltrichlorosilane, butyltrichlorosilane, isobutyltrichlorosilane, pentyltrichlorosilane, hexyltrichlorosilane, heptyltrichlorosilane, octyltrichlorosilane, nonyltrichlorosilane, decyltrichlorosilane, phenyltrichlorosilane, benzyltrichlorosilane, methyltribromosilane, ethyltribromosilane, isobutyltribromosilane, octyltribromosilane, phenyltribomosilane, dimethyldichlorosilane, diethyldichlorosilane, dipropyldichlorosilane, dibutyldichlorosilane, dihexyldichlorosilane, diphenyldichlorosilane, dibenzyldichlorosilane, dimethyldibromosilane, diethyldibromosilane, dihexyldibromosilane, diphenyldibromosilane, trimethylchlorosilane, triethylchlorosilane, tripropylchlorosilane, tributylchlorosilane, trihexylchlorosilane, triphenylchlorosilane, tribenzylchlorosilane, triethylbromosilane, trihexylchlorosilane, and triphenylbromosilane. Preferable among them are silicon tetrachloride, ethyltrichlorosilane, phenyltrichlorosilane, diethyldichlorosilane, and diphenyldichlorosilane.

(4) Titanium compound

The titanium compound used in this invention is a compound of divalent, trivalent, or tetravalent titanium which may be represented by the formula $Ti^n(OR''')_x(X')_y$ wherein R''' is alkyl or aryl group having from 1 to 6 carbon atoms, X is chloride or bromide, n=2, 3 or 4 and x+y=n. Examples of such a compound include titanium tetrachloride, titanium tetrabromide, trichloroethoxytitanium, trichlorobutoxytitanium, dichlorodiethoxytitanium, dichlorodibutoxytitanium, dichlorodiphenoxytitanium, chlorotriethoxytitanium, chlorotributoxytitanium, tetrabutoxytitanium, and titanium trichloride. Preferable among them are tetravalent titanium halides such as titanium tetrachloride, trichloroethyoxytitanium, dichlorodibutoxytitanium, and dichlorodiphenoxytitanium. Particularly preferable is titanium tetrachloride.

PREPARATION OF CATALYST COMPONENT

The catalyst component of this invention is obtained by contacting a contact product of magnesium alkoxide, halogenated hydrocarbon, and halogenated silane compound with a titanium compound. The contacting of magnesium alkoxide, halogenated hydrocarbon, and halogenated silane is accomplished by (1) contacting a magnesium alkoxide and a halogenated hydrocarbon with each other and then contacting the resulting contact product with a halogenated silane compound, or (2) contacting a magnesium alkoxide, halogenated hydrocarbon, and halogenated silane with one another at one time. The former method is preferred. In what follows, the method (1) and the method for contacting the contact product obtained by method (1) with a titanium compound are described.

(1) Contacting of magnesium alkoxide with halogenated hydrocarbon

The contacting of a magnesium alkoxide with a halogenated hydrocarbon is accomplished by mechanically copulverizing or merely stirring a solid or slurry mixture of a magnesium alkoxide and a solid or liquid halogenated hydrocarbon. Contacting by mechanical copulverizing is preferable.

The halogenated hydrocarbon may be selected from the above-mentioned compounds. Preferable among them is a polyhalogenated product of hydrocarbon having 2 or more carbon atoms. Examples of such compounds include 1,2-dichloroethane, 1,1,2-trichloroethane, 1,1,2-trichloroethylene, 1,1,2,2-tetrachloroethane, 1,2,2,2-tetrachloroethane, pentachloroethane, hexachloroethane, 1,2-dichloropropane, hexachloropropylene, octachloropropane, and hexachlorobenzene.

The magnesium alkoxide is contacted with a halogenated hydrocarbon in the ratio of 1 mol of magnesium alkoxide to 0.01 to 20 mol, preferably 0.1 to 2.0 mol, of halogenated hydrocarbon.

Mechanical copulverizing may be accomplished by using a grinder, such as rotary ball mill, vibratory ball mill, and impact mill, which is commonly used to obtain ground products. The copulverizing may be accomplished under reduced pressure or in an inert gas atmosphere, in the substantial absence of moisture and oxygen, as occasion demands.

The contacting may be accomplished at 0° to 200° C. for 0.5 to 100 hours in the case of mechanical copulverizing, and at 0° to 200° C. for 0.5 to 100 hours in the case of mere stirring.

The magnesium alkoxide may be contacted with a magnesium halide prior to being contacted with a halogenated hydrocarbon.

Preferred magnesium halides include magnesium chloride, magnesium bromide, and magnesium iodide; and most preferable among them is magnesium chloride.

Magnesium halides in the form of powder having a particle size from 1 to 50 μm are advantageously used; those having a greater particle size may also be used.

These magnesium halides should preferably be anhydrous ones which contain substantially no water of crystallization. Thus, commercial products should be heated at 200° to 600° C. in an inert gas such as nitrogen or at 100° to 400° C. under reduced pressure.

The contacting of a magnesium alkoxide with a magnesium halide is accomplished by mixing and stirring them or by mechanically copulverizing them in the presence or absence of an inert hydrocarbon.

The inert hydrocarbon includes hexane, heptane, octane, cyclohexane, benzene, toluene, and xylene.

One mole of magnesium alkoxide is contacted with 0.1 to 10 mol, preferably 0.3 to 2.0 mol, of magnesium halide. In the case where the contacting is accomplished in the presence of an inert hydrocarbon, the hydrocarbon should preferably be used in an amount of 1 to 100 g of the total quantity of magnesium alkoxide and magnesium halide.

The contacting of a magnesium alkoxide and a magnesium halide should preferably be accomplished at normal temperature to 200° C. for 0.1 to 100 hours in the case of mechanical copulverizing, and at normal temperature to 200° C. for 1 to 100 hours in the case of mixing and stirring in the presence of said hydrocarbon. Contacting by mechanical copulverizing is preferred. Mechanical copulverizing may be accomplished in the same way as mentioned above for contacting magnesium alkoxide and halogenated hydrocarbon.

The magnesium alkoxide pretreated with a magnesium halide as mentioned above is then contacted with a halogenated hydrocarbon. A halide of a hydrocarbon having only one carbon atom may also be used.

Alternatively, a magensium alkoxide, magnesium halide, and halogenated hydrocarbon may be contacted with one another at one time.

(2) Contacting with halogenated silane compound

The contact product of magnesium alkoxide and halogenated hydrocarbon is contacted with a halogenated silane. This contacting is accomplished by stirring them in the presence of the above-mentioned inert hydrocarbon or the above-mentioned halogenated hydrocarbon (preferably a liquid one).

One mol of magnesium alkoxide is contacted with 0.01 to 50 mol, preferably 0.1 to 5 mol, of halogenated silane. The contacting may be accomplished at 0° to 150° C., preferably 50° to 100° C., for 0.5 to 20 hours, preferably 1 to 5 hours.

(3) Contacting with titanium compound

The contact product obtained by contacting the contact product of magnesium alkoxide and halogenated hydrocarbon with a halogenated silane is referred to as the relevant contact product hereinafter. The relevant contact product is finally contacted with a titanium compound, whereby the catalyst component of this invention is produced. The relevant contact product may be washed with a proper cleaning agent such as the above-mentioned inert hydrocarbon before being contacted with a titanium compound.

The contacting of the relevant contact product with a titanium compound may be accomplished by bringing them together as they are, but may be accomplished in the presence of a hydrocarbon and/or halogenated hydrocarbon. Contacting may be accomplished by mixing and stirring both, or by mechanically copulverizing both.

The hydrocarbon includes saturated aliphatic, saturated alicyclic, and aromatic hydrocarbons of carbon number 6 to 12 such as hexane, heptane, octane, cyclohexane, benzene, toluene, and xylene. The halogenated hydrocarbon is selected from the compounds used in the contacting with the above-mentioned magnesium alkoxide. A liquid halogenated hydrocarbon is preferred.

The contacting is accomplished in the ratio of one gram atom of magnesium in the relevant contact product to 0.1 gram mol or more, preferably 1 to 5 gram mol, of the titanium compound. In the case where the contacting is accomplished in the presence of a hydrocarbon and/or halogenated hydrocarbon, the contacting should be performed at 0° to 200° C. for 0.5 to 20 hours, preferably at 60° to 150° C. for 1 to 5 hours.

The hydrocarbon and/or halogenated hydrocarbon should preferably be used in such an amount that the contact product is 10 to 300 g for 1 liter of liquid substance (hydrocarbon and/or liquid halogenated hydrocarbon and liquid titanium compound).

The solid substance obtained as mentioned above is separated from the liquid substance and, if necessary, is washed with an inert hydrocarbon such as hexane, heptane, octane, cyclohexane, benzene, toluene, and xylene, followed by drying, whereby the catalyst component of this invention is produced.

The catalyst component of this invention is a powder having a specific surface area of 200 to 650 m$^2$/g as measured by BET method at the adsorption temperature of liquid nitrogen, a pore volume of 0.1 to 0.4 cc/g, and an average pore radius of 10 to 13 Å. It has a narrow particle size distribution and contains particles of rather uniform size. It is composed of 10 to 25 wt% of magnesium atom, 3 to 8 wt% of titanium atom, 50 to 65 wt% of halogen atom, 0.01 to 10 wt% of silicon atom, and organic compounds. Moreover, it contains a small quantity of halogenated hydrocarbon and/or substances converted therefrom used in the preparation of the catalyst component.

The catalyst component prepared as mentioned above may be used as such for (co)polymerization of olefins; but may also be used after being contacted with an olefin and an organoaluminum compound. (This step is referred to as pretreatment hereinafter.)

The pretreatment may be accomplished in the presence of an inert hydrocarbon. According to the preferred method, the catalyst component is contacted with an olefin first and then with an organoaluminum compound. The treatment temperature is usually 0° to 80° C.

The organoaluminum compound used for the pretreatment may be any compound (mentioned later) that is used for the polymerization of olefins.

The pretreatment forms a polymer and the polymer is attached to the catalyst component. Adjustment should be made so that the quantity of the polymer is 0.05 to 10 g for 1 g of the catalyst component.

The pretreatment is effective in preventing the catalyst component and the desired polymer from becoming fine powder and in making it easy to control their particle size. In addition, the pretreatment improves the mechanical strength of the catalyst component.

CATALYST FOR POLYMERIZATION OF OLEFIN

The catalyst component of this invention is combined with an organoaluminum compound to be made into a catalyst for homopolymerization of an olefin or for copolymerization of an olefin and another olefin.

ORGANOALUMINUM COMPOUND

The organoaluminum compound to be combined with the catalyst component is one which is represented by the formula $R''''_n AlX''_{3-n}$, wherein $R''''$ is an alkyl group or aryl group, $X''$ is a halogen atom, alkoxy group, or hydrogen atom, n is an arbitrary number in the range of $1 \leq n \leq 3$. Preferred ones are alkyl aluminum compounds and a mixture thereof or complex thereof having 1 to 18 carbon atoms, preferably 2 to 6 carbon atoms, such as trialkyl aluminum, dialkyl aluminum monohalide, monoalkyl aluminum dihalide, alkyl aluminum sesquihalide, dialkyl aluminum monoalkoxide, and dialkyl aluminum monohydride. Examples of such compounds include trialkyl aluminum such as trimethyl aluminum, triethyl aluminum, tripropyl aluminum, triisobutyl aluminum, and trihexyl aluminum; dialkyl aluminum monohalide such as dimethyl aluminum chloride, diethyl aluminum chloride, diethyl aluminum bromide, diethyl aluminum iodide, and diisobutyl aluminum chloride; monoalkyl aluminum dihalide such as methyl aluminum dichloride, ethyl aluminum dichloride, ethyl aluminum dibromide, ethyl aluminum diiodide, and isobutyl aluminum dichloride; alkyl aluminum sesquihalide such as ethyl aluminum sesquichloride; dialkyl aluminum monoalkoxide such as dimethyl aluminum methoxide, diethyl aluminum ethoxide, diethyl aluminum phenoxide, dipropyl aluminum ethoxide, and diisobutyl aluminum phenoxide; and dialkyl aluminum hydride such as dimethyl aluminum hydride, diethyl aluminum hydride, dipropyl aluminum hydride, and diisobutyl aluminum hydride.

Preferable among them is trialkyl aluminum, particularly triethyl aluminum and triisobutyl aluminum. The trialkyl aluminum can be used in combination with the other organoaluminum compound such as commercially available diethyl aluminum chloride, ethyl aluminum dichloride, ethyl aluminum sesquichloride, diethyl aluminum ethoxide, and diethyl aluminum hydride, and a mixture or complex thereof.

In addition, the organoaluminum compound may be used alone or in combination with an electron donor compound. Examples of the electron donor compound includes carboxylic acids, carboxylic acid esters, alcohols, ethers, ketones, amines, amides, nitriles, aldehydes, alcoholates, phosphoamides, thioethers, thioesters, carbonic esters, and compounds of phosphorus, arsenic, or antimony attached to an organic group through a carbon or oxygen atom. Preferable among them are carboxylic acid esters, alcohols, and ethers.

Examples of carboxylic acid esters include butyl formate, ethyl acetate, butyl acetate, ethyl acrylate, ethyl butyrate, isobutyl isobutyrate, methyl methacrylate, diethyl maleate, diethyl tartrate, ethyl cyclohexanecarbonate, ethyl benzoate, ethyl p-methoxybenzoate, methyl p-methylbenzoate, ethyl p-tertbutylbenzoate, dibutyl phthalate, diallyl phthalate, and ethyl α-naphthoate. They are not limitative. Preferable among them are alkyl esters of aromatic carboxylic acid, particularly $C_{1-8}$ alkyl esters of benzoic acid or nucleussubstituted benzoic acid such as p-methyl benzoic acid and p-methoxy benzoic acid.

The alcohols are represented by the formula ROH, wherein R is an alkyl, alkenyl, cycloalkyl, aryl, or aralkyl group of carbon number 1 to 12. Examples of the alcohols include methanol, ethanol, propanol, isopropanol, butanol, isobutanol, pentanol, hexanol, octanol, 2-ethylhexanol, cyclohexanol, benzyl alcohol, and allyl alcohol.

The ethers are represented by the formula ROR', wherein R and R' are alkyl, alkenyl, cycloalkyl, aryl, or aralkyl groups of carbon number 1 to 12, and R and R' may be the same or different. Examples of the ethers include diethyl ether, diisopropyl ether, dibutyl ether, diisobutyl ether, diisoamyl ether, di-2-ethylhexyl ether, diallyl ether, ethyl allyl ether, butyl allyl ether, diphenyl ether, anisole, and ethyl phenyl ether.

These electron donor compounds may be used when an organoaluminum compound is used in combination with the catalyst component, or may be used after being contacted with an organoaluminum compound.

The organoaluminum compound should be used in an amount of 1 to 200 gram mol, particularly 20 to 500 gram mol, for 1 gram atom of titanium in the catalyst component.

In addition, the ratio of an organoaluminum compound to an electron donor compound should be such that aluminum in the organoaluminum compound is 0.1 to 40 gram atom, preferably 1 to 25 gram atom, for 1 mol of the electron donor compound.

POLYMERIZATION OF OLEFIN

The catalyst composed of the catalyst component prepared as mentioned above and an organoaluminum compound (and an electron donor compound) is useful as a catalyst for homopolymerization of monoolefin or copolymerization of monoolefin and other monoolefin or diolefin. It exhibits an outstanding performance when used as a catalyst for homopolymerization of ethylene and random or block copolymerization of ethylene and α-olefin or carbon number 3 to 10 such as propylene, 1-butene, 4-methyl-1-pentene, 1-hexene, and 1-octene.

The polymerization may be performed either in gas phase or liquid phase. The liquid phase polymerization may be accomplished in an inert hydrocarbon such as n-butane, isobutane, n-pentane, isopentane, hexane, heptane, octane, cyclohexane, benzene, toluene, and xylene, or in the liquid monomer. The polymerization temperature is usually $-80°$ C. to $+150°$ C., preferably 40° C. to 120° C. The polymerization pressure is 1 to 60 atm. The molecular weight modification of the resulting polymer is accomplished by the aid of hydrogen or other known molecular weight modifiers. In the copolymerization of olefins, the quantity of other olefin to be copolymerized is usually less than 30 wt%, particularly 0.5 to 15 wt%, based on the olefin. The polymerization with the catalyst system of this invention may be performed continuously or batchwise under the commonly used conditions. The (co)polymerization may be accomplished in one step or in two or more steps.

EFFECT OF INVENTION

When the catalyst component of this invention is used for homopolymerization of olefin, particularly ethylene, or for copolymerization of ethylene and other olefin, it exhibits a high catalytic activity and produces a marked effect on the molecular weight modification by hydrogen (particularly in the case where a magnesium alkoxide is perliminarily contacted with a magnesium halide). Therefore, it provides polymers having a high melt index and polymers having a high bulk density. Moreover, the catalyst keeps its high catalytic activity even under high hydrogen partial pressure.

In the case where the catalyst is used for producing polymers having a high melt index greater than 30, particularly higher than 200, the resulting polymer contains a minimum of low-molecular fraction which is soluble in the inert hydrocarbon used as a diluent or solvent.

EXAMPLES

The invention is described in more detail with reference to the following examples and application examples. The scope of this invention is not limited by the examples. Percent (%) in the examples and application examples means wt%, unless otherwise indicated.

The specific surface area (S.A.), pore volume, (P.V.), and mean pore radium (M.P.R.) of the catalyst component were measured by using SORPTOMATIC, Model 1810, made by CARLO ERBA. The particle size distribution of the catalyst component was measured according to the photo extinction method by using SKN 500 made by Seishin Kigyo Co., Ltd.

The melt index (MI) of the polymer was measured at 190° C. and under a load of 2.16 kg according to ASTM-D1238. The flow ratio (FR) is a quotient obtained by dividing the value (HLMI) by the value (MI), wherein HLMI is measured at 190° C. under a load of 21.6 kg and MI is measured at 190° C. under a load of 2.16 kg. It represents the flow ratio of a polymer which is a measure of molecular weight distribution of a polymer. The cyclohexane soluble (CHS), which indicates the low molecular weight fraction in a polymer, is the ratio of polymer which is extracted for 5 hours by boiling cyclohexane in a Soxhlet apparatus of improved type.

The catalyst activity Kc is the quantity (g) of polymer formed per 1 g of catalyst. The specific catalytic activity denotes the quantity (g) of polymer formed per 1 g of catalyst, per 1 hour of polymerization time, and per 1 kg/cm$^2$ of monomer partial pressure during polymerization. The bulk density was measured according to ASTM D1895-69, Method A.

EXAMPLE 1

Contacting of Magensium Diethoxide with Hexachloroethane 85 g of commercial magnesium diethoxide [Mg(OEt)$_2$] and 79 g of hexachloroethane (C$_2$Cl$_6$) were placed in a 1-liter stainless steel (SUS 32) mill pot containing 340 pieces of stainless steel (SUS 32) balls, 12 mm in diameter. The mill pot was mounted on a shaker and shaked for 15 hours to accomplish contacting. Thus there was obtained a ground product (S-1).

(The molar ratio of C$_2$Cl$_6$ to Mg(OEt)$_2$ is 0.45.)

Treatment With a Halogenated Silane 10.0 g of the ground product (S-1) obtained in the above step was placed in a 300 ml flask under a nitrogen atmosphere. To the flask were added 100 ml of n-heptane with stirring, and then 45 ml of n-heptane solution (1 mmol/ml) of diethyldichlorosilane was added dropwise at normal temperature. The flask was heated to 80° C. and reaction was carried out for 1 hour with stirring. After the reaction was complete, the flask was allowed to stand and the supernatant liquid was removed by decantation. The solids were washed 4 times with 150 ml portions of toluene at 80° C. Finally, 100 ml of toluene was added and the content was cooled to room temperature.

Treatment With Titanium Tetrachloride

To the toluene slurry obtained in the above step was added 50 ml of titanium tetrachloride under the nitrogen atmosphere, followed by stirring at 110° C. for 2 hours. The excess liquid was removed, and the solids were washed 6 times with 100 ml portions of n-hexane at 65° C., followed by drying at 50° C. for 1 hour under reduced pressure. Thus there was obtained 9.4 g of catalyst component containing 6.8% of titanium, 16.2% of magnesium, 56.3% of chlorine, and 1.7% of silicon. This catalyst component had a specific surface area of 510 m²/g, a pore volume of 0.327 cc/g and a mean pore radius of 13.8 Å.

EXAMPLES 2 TO 6

Catalyst components were prepared in the same way as in Example 1, except that the following halogenated silanes were used. Table 1 shows the composition and physical properties of the resulting catalyst components.

| Example | Halogenated Silane Compound |
|---|---|
| 2 | Ethyltrichlorosilane |
| 3 | Triethylchlorosilane |
| 4 | Diphenyldichlorosilane |
| 5 | Phenyltrichlorosilane |
| 6 | Silicon tetrachloride |

COMPARATIVE EXAMPLE 1

A solid substance was prepared by performing the same treatment as in Example 1 except that the treatment with diethyldichlorosilane was not performed. Table 1 shows the composition and physical properties of the resulting solid substance.

TABLE 1

| | Physical Properties | | | Composition (%) | | | |
|---|---|---|---|---|---|---|---|
| Example | S.A. (m²/g) | P.V. (cc/g) | M.P.R. (Å) | titanium | magnesium | chlorine | silicon |
| 2 | 482 | 0.342 | 11.5 | 6.6 | 15.8 | 55.8 | 1.9 |
| 3 | 570 | 0.330 | 12.2 | 7.4 | 15.5 | 56.1 | 1.0 |
| 4 | 509 | 0.280 | 13.8 | 7.5 | 16.4 | 56.5 | 1.6 |
| 5 | 476 | 0.319 | 12.9 | 6.9 | 15.3 | 55.5 | 1.3 |
| 6 | 525 | 0.323 | 11.7 | 7.0 | 16.7 | 56.7 | 2.0 |
| Comparative Example 1 | 560 | 0.374 | 13.4 | 10.7 | 13.4 | 57.1 | — |

EXAMPLES 7 AND 8

Catalyst components were prepared in the same way as in Example 1, except that hexachloroethane was replaced by 1,2-dichloroethane and hexachlorobenzene, respectively, and diethyldichlorosilane was replaced by ethyltrichlorosilane and diphenyldichlorosilane. Table 2 shows the composition and physical properties of the resulting catalyst components.

COMPARATIVE EXAMPLES 2 AND 3

A catalyst component was prepared in the same way as in Example 7, except that ethyltrichlorosilane was not used. Also, a catalyst component was prepared in the same way as in Example 8, except that diphenyldichlorosilane was not used. Table 2 shows the composition and physical properties of the resulting catalyst.

TABLE 2

| | Physical Properties | | | Composition (%) | | | |
|---|---|---|---|---|---|---|---|
| Example | S.A. (m²/g) | P.V. (cc/g) | M.P.R. (Å) | titanium | magnesium | chlorine | silicon |
| 7 | 451 | 0.281 | 12.2 | 6.7 | 15.9 | 57.2 | 1.8 |
| 8 | 483 | 0.301 | 12.9 | 7.3 | 16.1 | 56.5 | 1.6 |
| Comparative Example 2 | 460 | 0.288 | 11.8 | 8.6 | 13.2 | 58.2 | — |
| 3 | 525 | 0.310 | 13.7 | 9.6 | 13.0 | 57.6 | — |

EXAMPLE 9

Contacting of Magnesium Diethoxide, Magnesium Chloride, and Hexachloroethane Into a mill pot as used in Example 1 were placed 58 g of commercial magnesium diethoxide and 48 g of anhydrous magnesium chloride. The two components were copulverized by shaking for 2 hours. 32 g of hexachloroethane was added and the copulverization was continued for 15 hours. The molar ratio of Mg(O-Et)₂/MgCl₂/C₂Cl₆ was 1/1/0.24. Thus there was obtained a ground product (S-2).

Treatment With Halogenated Silane

Into a 300-ml flask was placed 10.6 g of S-2 under the nitrogen atmosphere, and 100 ml of n-heptane was added. Then, 39 ml of diethyldichlorosilane solution in n-heptane (1 mmol/ml) was added dropwise at normal temperature. The flask was heated to 80° C. and reaction was carried out for 1 hour with stirring. After the reaction was complete, the flask was allowed to stand and the supernatant liquid was removed by decantation. The solids were washed 4 times with 150 ml portions of toluene at 80° C. Finally, 100 ml of toluene was added and the content was cooled to room temperature.

Treatment With Titanium Tetrachloride

To the toluene slurry obtained in the above step was added 50 ml of titanium tetrachloride under the nitrogen atmosphere, followed by stirring at 110° C. for 2 hours. The excess liquid was removed, and the solids were washed 6 times with 100 ml portions of n-hexane at 65° C., followed by drying at 50° C. for 1 hour under reduced pressure. Thus there was obtained a catalyst component which has the composition and physical properties as shown in Table 3.

EXAMPLES 10 TO 12

S-2 was treated in the same way as in Example 9, except that diethyldichlorosilane was replaced by the following halogenated silanes. Thus there were obtained catalyst components which have the composition and physical properties as shown in Table 3.

| Example | Halogenated Silane Compound |
|---|---|
| 10 | Diphenyldichlorosilane |
| 11 | Triethylchlorosilane |
| 12 | Silicon Tetrachloride |

COMPARATIVE EXAMPLE 4

A solid substance was prepared by performing the same treatment as in Example 9, except that the treatment with diethyldichlorosilane was not performed.

Table 3 shows the composition and physical properties of the resulting solid substance.

TABLE 3

| Example | Physical Properites | | | Composition (%) | | | |
| --- | --- | --- | --- | --- | --- | --- | --- |
| | S.A. (m²/g) | P.V. (cc/g) | M.P.R. (Å) | tita-nium | magne-sium | chlo-rine | sil-icon |
| 9 | 432 | 0.258 | 13.9 | 4.4 | 21.4 | 57.7 | 0.6 |
| 10 | 372 | 0.244 | 12.6 | 4.4 | 19.6 | 55.3 | 0.8 |
| 11 | 355 | 0.280 | 11.7 | 3.8 | 21.0 | 52.7 | 0.6 |
| 12 | 382 | 0.261 | 12.5 | 6.5 | 18.5 | 57.6 | 0.6 |
| Comparative Example | | | | | | | |
| 4 | 388 | 0.260 | 13.4 | 9.8 | 17.3 | 56.8 | — |

EXAMPLES 13 AND 14

Catalyst components were prepared in the same way as in Example 9, except that hexachloroethane was replaced by 1,2-dichloroethane and hexachlorobenzene, respectively, and diethyldichlorosilane was replaced by ethyltrichlorosilane and diphenyldichlorosilane. Table 4 shows the composition and physical properties of the resulting catalyst components.

COMPARATIVE EXAMPLES 5 AND 6

A catalyst component was prepared in the same way as in Example 13, except that ethyltrichlorosilane was not used. Also, a catalyst component was prepared in the same way as in Example 14, except that diphenyldichlorosilane was not used. Table 4 shows the composition and physical properties of the resulting catalyst components.

TABLE 4

| Example | Physical Properties | | | Composition (%) | | | |
| --- | --- | --- | --- | --- | --- | --- | --- |
| | S.A. (m²/g) | P.V. (cc/g) | M.P.R. (Å) | tita-nium | magne-sium | chlo-rine | sil-icon |
| 13 | 356 | 0.241 | 12.9 | 4.7 | 20.6 | 58.8 | 0.7 |
| 14 | 378 | 0.245 | 13.1 | 5.2 | 19.9 | 59.3 | 0.8 |
| Comparative Example | | | | | | | |
| 5 | 326 | 0.226 | 12.6 | 7.3 | 18.1 | 59.2 | — |
| 6 | 362 | 0.249 | 13.3 | 8.0 | 17.8 | 57.0 | — |

APPLICATION EXAMPLE 1

Polymerization of Ethylene

Into a 1.5-liter stainless steel (SUS 32) autoclave equipped with a stirrer were charged under the nitrogen atmosphere 11.8 mg of catalyst component obtained in Example 1, 0.7 mmol of triisobutyl aluminum, and 700 g of isobutane. The polymerization system was heated to 80° C. Hydrogen was introduced until the hydrogen partial pressure reached 8.5 kg/cm² and then ethylene was introduced until the ethylene partial pressure reached 5 kg/cm². Polymerization was carried out for 60 minutes, while ethylene was being supplied continuously so that the total pressure of the polymerization system was kept constant. After the polymerizaton was complete, the solvent and unreacted ethylene were purged from the polymerization system. White powdery polymer was discharged and dried at 70° C. for 10 hours under reduced pressure. Thus there was obtained 274 g of polyethylene powder having an MI of 341 and a bulk density of 0.36 g/cc. (Catalytic activity Kc: 23,200 and specific catalytic activity: 4.640.) The CHS of the polymer was 4.9%.

APPLICATION EXAMPLES 2 TO 15

Polymerization of Ethylene

Polymerization of ethylene was carried out in the same manner as in Application Example 1, except that the catalyst components as obtained in Examples 2 to 8 and Comparative Examples 1 to 3 were used and the partial pressure of hydrogen was changed in the polymerization. The results are shown in Table 5.

TABLE 5

| Application Example | Catalyst Component | Hydrogen Partial Pressure (kg/cm²) | Catalytic Activity | | MI | Bulk Density | CHS |
| --- | --- | --- | --- | --- | --- | --- | --- |
| | | | Kc | Specific Activity | | | |
| 2 | Example 2 | 8.5 | 22,400 | 4,480 | 332 | 0.38 | 4.8 |
| 3 | Example 3 | 9.0 | 21,000 | 4,200 | 364 | 0.34 | 5.0 |
| 4 | Example 4 | 8.2 | 22,550 | 4,510 | 315 | 0.39 | 4.7 |
| 5 | Example 5 | 8.3 | 21,800 | 4,360 | 312 | 0.35 | 4.8 |
| 6 | Example 6 | 8.0 | 22,000 | 4,400 | 347 | 0.38 | 5.0 |
| 7 | Example 7 | 8.4 | 21,600 | 4,320 | 352 | 0.33 | 5.0 |
| 8 | Example 8 | 8.2 | 22,300 | 4,460 | 336 | 0.37 | 4.9 |
| 9 | Example 1 | 4.6 | 25,250 | 5,050 | 43 | 0.37 | 1.7 |
| 10 | Example 1 | 10.1 | 20,500 | 4,300 | 508 | 0.33 | 5.8 |
| 11 | Comp. Ex. 1 | 10.0 | 27,500 | 5,500 | 350 | 0.36 | 6.3 |
| 12 | Comp. Ex. 1 | 5.2 | 30,050 | 6,010 | 34 | 0.34 | 2.0 |
| 13 | Comp. Ex. 1 | 10.9 | 26,300 | 5,260 | 532 | 0.37 | 7.9 |
| 14 | Comp. Ex. 2 | 9.7 | 25,100 | 5,020 | 325 | 0.35 | 6.2 |
| 15 | Comp. Ex. 3 | 10.2 | 25,700 | 5,140 | 331 | 0.36 | 6.0 |

APPLICATION EXAMPLE 16

Copolymerization of Ethylene and 1-butene

Into the same autoclave as used in Application Example 1 were charged under the nitrogen atmosphere 12.0 mg of catalyst component as obtained in Example 1, 0.7 mmol of triisobutyl aluminum, and 700 g of isobutane. The polymerization system was heated to 85° C. Hydrogen was introduced until the hydrogen partial pressure reached 0.08 kg/cm² and then ethylene was introduced until the ethylene partial pressure reached 3 kg/cm², and finally 5 g of 1-butene was added. Polymerization was carried out for 30 minutes, while ethylene was being supplied continuously so that the total pressure of the polymerization system was kept constant. After the polymerization was complete, the same steps as in Application Example 1 were taken. Thus there was obtained 290 g of ethylene-1-butene copolymer having an MI of 0.0020, a bulk density of 0.34 g/cc, and a true density of 0.930 g/cc. (Specific catalytic activity: 16,100.)

APPLICATION EXAMPLE 17

Into a 1.5-liter stainless steel (SUS 32) autoclave equipped with a stirrer were charged under the nitrogen atmosphere 12 mg of catalyst component as obtained in Example 1, 0.7 mmol of triisobutyl aluminum, and 700 ml of isobutane. The polymerization system was heated to 80° C. Hydrogen was introduced until the hydrogen partial pressure reached 0.08 kg/cm$^2$ and then ethylene was introduced until the ethylene partial pressure reached 3.0 kg/cm$^2$, and finally 3.0 g of 1-butene was added. Polymerization was carried out for 10 minutes, while ethylene was being supplied continuously. Thus there was obtained 101 g of polymer.

Then, the second stage of polymerization was performed under the different conditions. The polymerization system was heated to 85° C. and hydrogen was introduced until the hydrogen partial pressure reached 7.5 kg/cm$^2$, and ethylene was introduced until the partial pressure of ethylene reached 3 kg/cm$^2$, without adding 1-butene. Polymerization was carried out for 35 minutes while ethylene was being supplied continuously so that the total pressure of the polymerization system was kept constant. After the polymerization was complete, isobutane and unreacted ethylene and 1-butene were purged and white powdery polymer was discharged. This polymer was dried at 70° C. for 10 hours under reduced pressure. Thus there was obtained 202 g of ethylene-1-butene copolymer having an MI of 0.050, a bulk density of 0.30 g/cc, and a true density of 0.952 g/cc.

APPLICATION EXAMPLES 18 TO 30

Polymerization of Ethylene

Polymerization of ethylene was carried out in the same way as in Application Example 1, except that the catalyst component was replaced by the ones obtained in Examples 9 to 14 and Comparative Examples 4 to 6. The results are shown in Table 6.

TABLE 6

| Application Example | Catalyst Component | Hydrogen Partial Pressure (kg/cm$^2$) | Catalytic Activity Kc | Specific Activity | MI | Bulk Density | CHS |
|---|---|---|---|---|---|---|---|
| 18 | Example 9 | 7.7 | 19,700 | 3,940 | 263 | 0.36 | 3.9 |
| 19 | Example 10 | 7.4 | 18,800 | 3,760 | 260 | 0.38 | 4.1 |
| 20 | Example 11 | 8.2 | 19,450 | 3,890 | 275 | 0.34 | 3.8 |
| 21 | Example 12 | 7.6 | 18,200 | 3,640 | 256 | 0.33 | 4.0 |
| 22 | Example 13 | 7.8 | 18,900 | 3,780 | 273 | 0.38 | 4.0 |
| 23 | Example 14 | 7.5 | 19,400 | 3,880 | 259 | 0.38 | 3.9 |
| 24 | Example 9 | 5.2 | 22,750 | 4,550 | 33 | 0.37 | 1.4 |
| 25 | Example 9 | 13.2 | 18,300 | 3,660 | 511 | 0.38 | 5.4 |
| 26 | Comp. Ex. 4 | 8.0 | 21,500 | 4,300 | 241 | 0.37 | 4.7 |
| 27 | Comp. Ex. 4 | 4.7 | 23,400 | 4,680 | 40 | 0.35 | 2.1 |
| 28 | Comp. Ex. 4 | 10.0 | 20,500 | 4,100 | 550 | 0.37 | 6.5 |
| 29 | Comp. Ex. 5 | 8.3 | 21,200 | 4,240 | 261 | 0.34 | 4.8 |
| 30 | Comp. Ex. 6 | 8.5 | 20,900 | 4,180 | 278 | 0.36 | 5.0 |

APPLICATION EXAMPLE 31

Copolymerization of Ethylene and 1-butene

Copolymerization of ethylene and butene-1 was carried out in the same way as in Application Example 16, except that the catalyst component was replaced by 12.2 mg of the one obtained in Example 9. Thus there was obtained 178 g of ethylene-1-butene copolymer having an MI of 0.040, a bulk density of 0.36 g/cc, and a true density of 0.926 g/cc. (Specific catalytic activity: 9,900.)

APPLICATION EXAMPLE 32

Into a 1.5-liter stainless steel (SUS 32) autoclave equipped with a stirrer were charged under the nitrogen atmosphere 12 mg of catalyst component as obtained in Example 9, 0.7 mmol of triisobutyl aluminum, and 700 ml of isobutane. The polymerization system was heated to 80° C. Hydrogen was introduced until the hydrogen partial pressure reached 0.06 kg/cm$^2$ and then ethylene was introduced until the ethylene partial pressure reached 3.0 kg/cm$^2$, and finally 3.0 g of 1-butene was added. Polymerization was carried out for 20 minutes, while ethylene was being supplied continuously so that the total pressure of the polymerization system was kept constant. Thus there was obtained 101 g of polymer.

Then, the second stage of polymerization was performed under the different conditions. The polymerization system was heated to 85° C. and hydrogen was introduced until the hydrogen partial pressure reached 7.5 kg/cm$^2$, and ethylene was introduced until the partial pressure of ethylene reached 3 kg/cm$^2$, without adding 1-butene. Polymerization was carried out for 40 minutes while ethylene was being supplied continuously so that the total pressure of the polymerization system was kept constant. After the polymerization was complete, isobutane and unreacted ethylene and 1-butene were purged and white powdery polymer was discharged. This polymer was dried at 70° C. for 10 hours under reduced pressure. Thus there was obtained 202 g of ethylene-1-butene copolymer having an MI of 0.048, a bulk density of 0.30 g/cc, and a true density of 0.949 g/cc.

What is claimed is:

1. A catalyst component for use in the polymerization of olefins which is obtained by contacting a magnesium compound represented by the formula Mg(OR)(OR'), a halogenated hydrocarbon selected from the group consisting of mono or polyhalogen substituted compounds of saturated or unsaturated aliphatic, alicyclic or aromatic hydrocarbons, a halogenated silane represented by the formula R''$_m$SiX$_{4-m}$ and a titanium compound, wherein R and R', which may be the same or different, are alkyl, alkenyl, cycloalkyl, aryl and aralkyl groups, R'' is hydrogen or a hydrocarbon group containing from 1 to about 10 carbon atoms, X is a halogen atom and m is 0, 1, 2 or 3.

2. The catalyst component of claim 1 wherein the magnesium compound is contacted sequentially with the halogenated hydrocarbon, silane and titanium compound.

3. The catalyst component of claim 2 wherein the contact product of contacting the magnesium compound, halogenated hydrocarbon and silane is washed prior to contact with the titanium compound.

4. The catalyst component of claim 2 wherein the magnesium compound is contacted with a magnesium halide prior to contact with the halogenated hydrocarbon.

5. The catalyst component of claim 1 wherein the titanium compound is represented by the formula $Ti^n(OR''')_x(X')_y$ wherein $R'''$ is an alkyl or aryl group having from 1 to about 6 carbon atoms, $X'$ is chloride or bromide, and n is 2, 3 or 4 and the sum of $x+y$ is n.

6. A catalyst for the polymerization of olefins comprising (a) an organoaluminum compound represented by the formula $R''''_n AlX_{3-n}$, wherein $R''''$ is an alkyl or aryl group, $X''$ is a halogen atom, alkoxy group or hydrogen atom, and is in the range of $1 \leq n \leq 3$, and (b) a catalyst component obtained by contacting a magnesium compound represented by the formula Mg(OR)(OR'), a halogenated hydrocarbon selected from the group consisting of mono or polyhalogen substituted compounds of saturated or unsaturated aliphatic, alicyclic or aromatic hydrocarbons, a halogenated silane represented by the formula $R''_m SiX_{4-m}$ and a titanium compound, wherein R and R', which may be the same or different, are alkyl, alkenyl, cycloalkyl, aryl and aralkyl groups, R'' is hydrogen or a hydrocarbon group containing from 1 to about 10 carbon atoms, X is a halogen atom and m is 0, 1, 2 or 3.

7. The catalyst of claim 6 wherein the magnesium compound is contacted sequentially with the halogenated hydrocarbon, silane and titanium compound.

8. The catalyst of claim 7 wherein the contact product of the magnesium compound, halogenated hydrocarbon and silane is washed prior to contact with the titanium compound.

9. The catalyst of claim 7 wherein the magnesium compound is contacted with a magnesium halide prior to contact with the halogenated hydrocarbon.

10. The catalyst of claim 6 wherein the titanium compound is represented by the formula $Ti^n(OR''')_x(X')_y$ wherein $R'''$ is an alkyl or aryl group having from 1 to about 6 carbon atoms, $X'$ is chloride or bromide, and n is 2, 3 or 4 and the sum of $x+y$ is n.

* * * * *